UNITED STATES PATENT OFFICE.

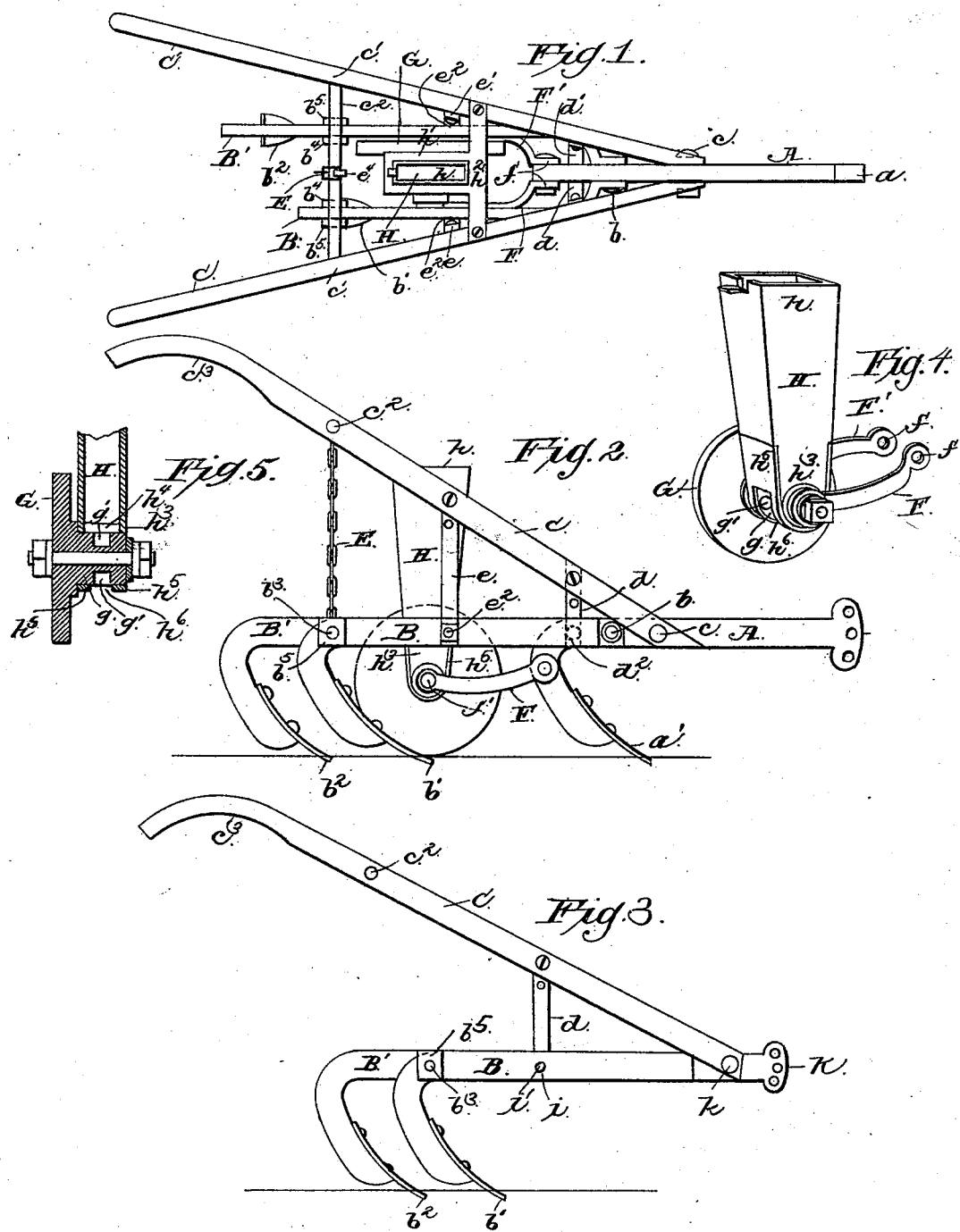
(No Model.)
J. R. GILLILAND.
COMBINED CULTIVATOR AND CORN PLANTER.
No. 342,791. Patented June 1, 1886.

JOHN ROSS GILLILAND, OF GADSDEN, ALABAMA, ASSIGNOR OF ONE-HALF TO M. E. GILLILAND, OF SAME PLACE.

COMBINED CULTIVATOR AND CORN-PLANTER.

SPECIFICATION forming part of Letters Patent No. 342,791, dated June 1, 1886.

Application filed February 5, 1886. Serial No. 190,927. (No model.)

*To all whom it may concern:*

Be it known that I, JOHN ROSS GILLILAND, a citizen of the United States, residing at Gadsden, in the county of Etowah and State of Alabama, have invented a new and useful Improvement in Combined Cultivators and Corn-Planters, of which the following is a specification, reference being had to the accompanying drawings.

My invention relates to improvements in combined cultivators and corn-planters; and the novelty consists in the construction, arrangement, and combination of the several parts, substantially as hereinafter described, and specifically pointed out in the claim.

In the drawings, Figure 1 represents a plan view of a combined cultivator and corn-planter embodying my improvement. Fig. 2 represents a side elevation thereof, showing the implement as it appears when in position for use in its dual capacity. Fig. 3 represents an elevation showing the forward plow-beam removed from the rear plow-beam and the handles secured to said rear plow-beams for use as a plow. Fig. 4 represents a detached detail view of the seed-dropping wheel, its hopper, and means for securing it in position. Fig. 5 represents a sectional view taken through the bearings of the seed-dropping wheel and the lower end of the hopper. Fig. 6 represents a detached detail view of the adjustable clevis.

Referring to the drawings, in which similar letters of reference denote similar parts, A designates the forward plow-beam, preferably made of metal, having its forward end fashioned into a clevis, $a$, for the purpose of securing a draft-chain. The rear end of the beam A is curved or bent downward and forward and is provided with a plow-blade, $a'$, of the usual well-known construction—*i. e.*, triangular in shape, and having the apex of its angle down.

B B' designate the rear or cultivator beams, which are at their forward ends connected by a bolt, $b$, to the plow-beam A at a point near the rear end thereof. Each of the beams B B' is at its forward end curved laterally to give perfect freedom of action to the hopper and dropping-wheel of the corn-planter, as will be hereinafter described. The rear end of each of the beams B B' is curved downward and forward in manner similar to that of the beam A, and for a similar purpose, and are at their lower ends each provided with a blade, $b'$ $b^2$, which may be, as occasion demands, either an ordinary plow-blade, similar to the blade $a'$, or furrow-forming blades, as shown in the drawings. I preferably make one of the beams, B', of greater length than its companion beam, B, whereby the blades $b'$ $b^2$ are arranged diagonally as regards each other and the plane of the beams B B'.

$b^3$ designates a bolt or bar that extends transversely across the machine from one to the other of the beams B B', and passes through suitable apertures formed therein for its reception. Each end of the bar $b^3$ is screw-threaded and carries nuts $b^4$ $b^5$, that bear against the inner and outer faces, respectively, of the beams B B', for the purpose of adjusting said beams nearer to or farther from each other and holding them in fixed position when so adjusted.

C C' designate handles pivoted by a bolt, $c$, at their lower ends and opposite each other to the beam A. The handles C C' extend upwardly and outwardly in inclined directions, and are connected together at $c'$ by a rod or bar, $c^2$. The upper end of each of the handles is provided with the usual curved gripping portion, $c^3$.

$d$ $d'$ designate braces, that extend from the handles C C', near the lower ends thereof, to and are secured by a bolt, $d^2$, with the rear end of the plow-beam A. $e$ $e'$ designate similar braces, that extend from points intermediate of the ends of the handles to points $e^2$ upon the plow-beams B B', whereby, inasmuch as the handles are by the braces $d$ $d'$ and their end connection held at an angle to the beam A, the beams B B' are held in alignment, as regards the horizontal plane, with said beam A. The upper ends of the braces $e$ $e'$ are removable from the handles, to permit the beams B B' to be raised or lowered, as required, and said braces are provided with a series of apertures, whereby to adjust the beams up or down. When it is found desirable to limit the downward movement of the beams B B' as regards the handles C C', while the upward movement of said beams is to remain unchecked, I use a chain, E, the lower end of which is connected to the bar $b^3$, while its opposite upper end, as well as any of the links composing said chain, engages a stud, $e^4$, projecting from the bar $c^2$, and having a hooked upper end to engage and hold said chain.

F F' designate downwardly and laterally curved arms, that project rearwardly from a pivotal point, $f$, upon the beam A, and are provided at their lower ends with apertures to receive journals $f'$ of the planter-wheel G.

$g$ designates a boss formed at one side of the wheel G, at the middle thereof, and having its periphery concentric with the periphery of said wheel G, as shown.

$g'$ $g'$ designate recesses or pockets formed in the surface or periphery of the boss $g$, upon opposite sides of the boss $g$, for a purpose hereinafter described.

H designates the seed-hopper, the upper end, $h$, of which is held in a loop or strap, $h'$, projecting from a bar, $h^2$, that extends from one to the other of the handles C C' upon the upper surfaces thereof. The hopper H is free to move vertically within the loop $h'$, and extends thence downward to and rests upon the boss $g$ at its lower end, $h^3$.

$h^4$ designates a small flange, that is placed at one side within the lower end of the hopper, to form a guide that directs the grain from the hopper H to the pockets $g'$ in the boss $g$ and ground.

$h^5$ designates a strap that surrounds the boss $g$, and is secured at its ends to the edges of the hopper, at the lower end thereof. The strap $h^5$ is provided at its lower side with a slot or opening, $h^6$, through which seed passes from the boss $g$ to the ground.

The arms F F' are free to move up or down at their outer ends, such movement caused by the wheel G passing over obstacles—as stones, clods of earth, &c.—in its track.

In Fig. 2 of the drawings I have shown the device as it appears when ready for use as a combined corn or seed planter and cultivator, the respective plow-blades $a'$ $b'$ $b^2$ as a furrow-opener for the seed, and furrow-coverer to cover the same when dropped. The seed-hopper, its operating-wheel, and the arms F F' may be removed from the device. When so arranged, the device forms a cultivator, and as such the plow or coverer blades $b'$ $b^2$ are replaced by blades similar in all respects to the blade $a'$.

In Fig. 3 I show the forward plow-beam, its attachments, and the seed-dropping device removed from the machine for the purpose of transforming said machine into a plow or two-blade cultivator. When so used, the handles C C' are secured at their forward ends to the beams B B', while the lower ends of the braces $d$ $d'$ are secured to said beams at points $i$ by bolts $i'$, that pass through apertures formed at said points through the beams. The forward ends of the beams B B' are secured together and to a removable clevis, K, by a bolt, $k$, as shown.

I claim—

In a combined seed-planter and cultivator, the combination of a vertically-moving hopper, H, seed-dropping wheel G, having boss $g$, provided with pockets $g'$, strap $h^5$, having slot $h^6$, with pivoted arms F F', plow-beams A B B', handles C C', chain E, braces $d$ $d'$ and $e$ $e'$, and beam-adjusting screw-threaded bolt $b^3$, having nuts $b^4$ $b^5$, substantially as described.

In testimony that I claim the foregoing as my own I have hereto affixed my signature in presence of two witnesses.

JOHN ROSS GILLILAND.

Witnesses:
DAVID M. GILBREUTH,
JO. S. DAY.